United States Patent [19]

Jackson

[11] E Patent Number: Re. 31,710

[45] Reissued Date of Patent: Oct. 23, 1984

[54] PERSONALIZED ON-LINE PRINTING AND INSERTING MAGAZINE BINDING MACHINE

[75] Inventor: Dale H. Jackson, Plattsburgh, N.Y.

[73] Assignee: Harris Corporation, Cleveland, Ohio

[21] Appl. No.: 124,779

[22] Filed: Feb. 26, 1980

Related U.S. Patent Documents

Reissue of:

[64] Patent No.: 4,149,711
Issued: Apr. 17, 1979
Appl. No.: 865,944
Filed: Dec. 30, 1977

U.S. Applications:

[63] Continuation-in-part of Ser. No. 810,051, Jun. 27, 1977, abandoned.

[51] Int. Cl.[3] ..... B65H 5/30
[52] U.S. Cl. ..... 270/57; 270/58
[58] Field of Search ..... 270/54–58

[56] References Cited

U.S. PATENT DOCUMENTS

| | | | |
|---|---|---|---|
| 2,711,897 | 6/1955 | Grunlee | 270/54 |
| 3,052,463 | 9/1962 | Snyder | 270/57 |
| 3,717,337 | 2/1973 | McCain | 271/13 |
| 3,917,252 | 11/1975 | Harder | 270/58 |
| 3,955,750 | 5/1976 | Huffman | 270/37 |

*Primary Examiner*—Edgar S. Burr
*Assistant Examiner*—A. Heinz
*Attorney, Agent, or Firm*—Yount & Tarolli

[57] ABSTRACT

A method and apparatus for handling signatures such as magazines or the like which includes the on-line printing of personalized information onto materials to be inserted within a finished magazine. The system also provides on-line printing of personalized information onto materials adhered to the magazine cover, such as the address label. The on-line printed materials and the magazine or other signature are combined after the on-line printing is completed. The system operates under control of a process computer which includes means for storing the personalized information.

22 Claims, 6 Drawing Figures

PERSONALIZED ON-LINE PRINTING AND INSERTING MAGAZINE BINDING MACHINE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of application Ser. No. 810,051 filed June 27, 1977, now abandoned.

BACKGROUND OF THE INVENTION

This invention relates to a method and apparatus for handling preprinted signatures such as magazines or the like and more particularly to an automated system which includes the on-line printing of personalized information onto materials to be inserted within a finished magazine. The system also provides for on-line printing of information onto the magazine cover or onto materials adhered thereto such as the address label. The system provides for a momentary interruption in the conventional preprinted signature handling system in order to introduce special material for personalized printing, such as card, into the signature flow in order to utilize an on-line printing device, which may be the conventional on-line label printing device.

In the following specification and claims, it is to be understood that the word "signature" includes any material assembled therefrom, including but not limited to, magazines, journals, periodicals, catalogs, directories, books and pamphlets.

There is disclosed in U.S. Pat. No. 3,917,252 assigned to the Assignee herein, a method and apparatus which enables a magazine publisher to provide different issues of a magazine containing different combinations of advertising for different subscriber groups. This is accomplished by causing the magazine to be made up from different combinations of signatures for different groups of subscribers. Operation of that system is controlled from stored information based on known subscriber data. This system may also be used to prepare the subscriber's mailing label as that same subscriber's magazine is being made up.

In U.S. Pat. No. 3,819,173 assigned to the Assignee herein, there is disclosed a system which, in addition to producing different magazines for different subscribers, includes off-line or "beside-line" means for punching and/or printing and inserting subscription renewal cards or the like for selected individual subscribers as the subscribers magazine is being made up.

SUMMARY OF THE INVENTION

The present invention carries forward the basic concepts employed in the aforementioned patents while providing a somewhat simplified and improved system. The present system utilizes subscriber data for the on-line processing of materials to be inserted into particular magazines. In particular such processing includes printing of personalized information onto materials such as subscription renewal cards and the like for selected individual subscribers. The system also provides for insertion of such materials into the completed subscriber's magazine. The system controls the feeding of finished magazines to a conveyor to create a space or spaces adjacent a finished magazine for the insertion of materials to receive on-line printing. The printing is then applied as the card or other material moves along the conveyor and the card is then collated with and inserted into the magazine.

Briefly, the invention provides an apparatus for collating preprinted signatures and at least one card including conveyor means for moving preprinted signatures and cards past a processing station. The conveyor means has a plurality of chain spaces each of which is adapted to receive either a printed signature or a card. Means are provided for feeding preprinted signatures into the chain spaces and other means are provided for feeding cards into the chain spaces. Control means are provided for controlling the operation of the signature feed means and the card feed means to feed either a signature or a card to a chain space. Means are provided downstream of the processing station for positioning a card that has moved through the processing station in a chain space that has a signature located therein.

The invention also provides a method for collating preprinted signatures and at least one card including the steps of providing a path having a series of spaces, each adapted to receive a signature or a card, and moving the path. Further steps includes the feeding of either a signature or a card to each space, processing the signatures and cards while they are in the moving path and positioning a card in a certain one of the spaces into a certain other space which contains a signature.

DESCRIPTION OF A PREFERRED EMBODIMENT

Figure 1:
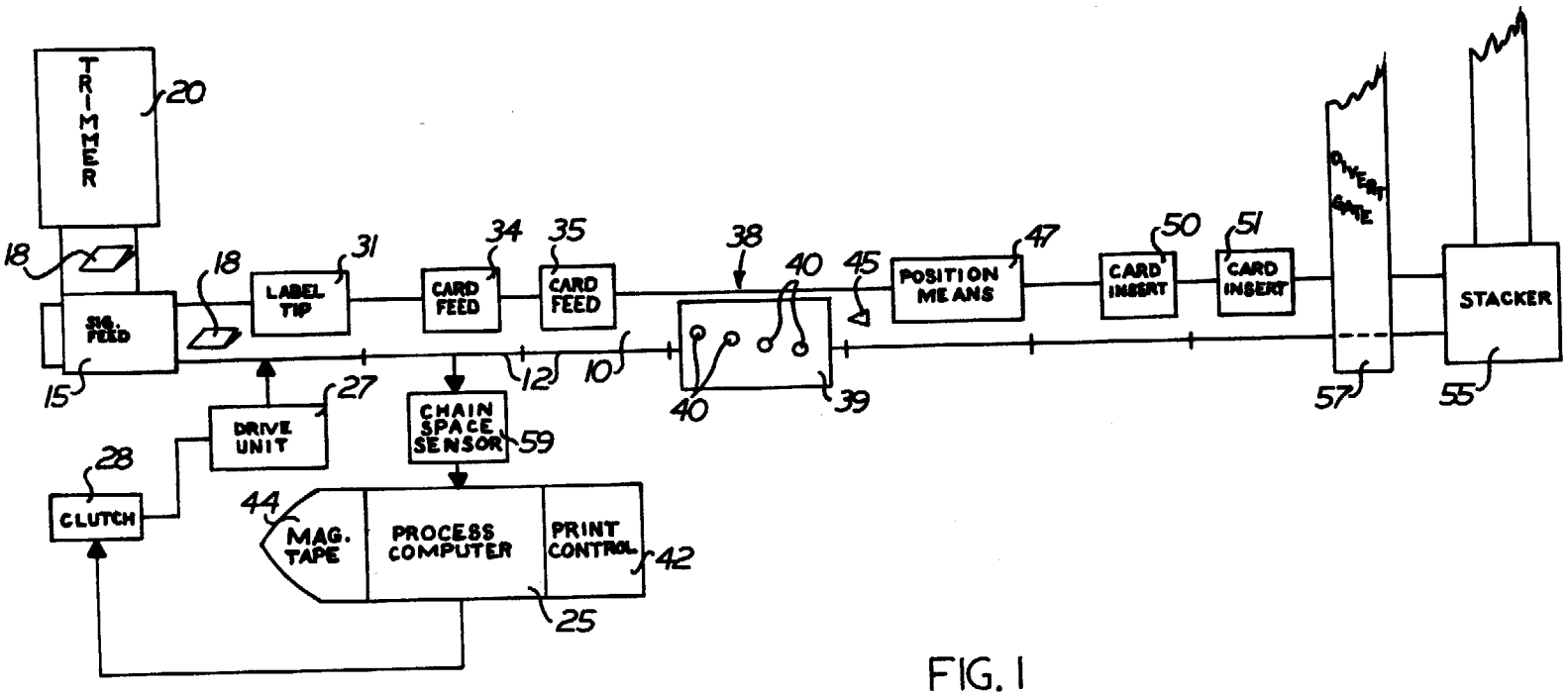
FIG. 1 is a schematic plan view of a system embodying the present invention.

Referring now to the drawings and initially to FIG. 1, a system embodying the present invention includes a conveyor 10 having a series of chain spaces 12 for the reception of signatures and/or inserts such as cards or the like. The conveyor defines a path for moving the signatures and inserts. At the entrance end of conveyor 10 there is positioned a shuttle feeder 15 which receives signatures 18 such as magazines or the like from a trimmer 20. It is normally the function of such a feeder to feed a single signature to each chain space of conveyor 10. Feeder 15, however, is operative under control of a process computer 25 to feed a signature to or to withhold it from each chain space 12. This may be accomplished as shown in FIG. 1 by means of a drive unit 27 which is operable to drive both conveyor 10 and, through a clutch 28, feeder 15. So long as clutch 28 is engaged, drive unit 27 causes feeder 15 to deposit a signature in each moving chain space 12 of the conveyor. Clutch 28 may, however, be disengaged upon command from process computer 25 to cause feeder 15 to withhold a signature and thereby create a vacant chain space.

Downstream of shuttle feeder 15 is a label tipper 31 which is operable under command from process computer 25 to adhere a blank label to a signature passing beneath it. The label tipper withholds a label for a vacant chain space.

Further along conveyor 10 there are positioned a pair of feed heads 34, 35 for feeding unlabeled inserts, usually cards, to vacant chain spaces upon command from process computer 25. The feeding of each card is correlated with the creation of a vacant chain space by withholding of a signature as described above. As a result the cards fed to vacant chain spaces may later be collated with the adjacent signatures.

An on-line processing station 38 is located downstream of card feed heads 34, 35 for the on-line processing of signatures and/or cards passing along conveyor 10. As illustrated, the processing station includes an ink jet printing system 39 having a plurality of printing heads 40, four being shown. The printing system provides on-line printing of personalized information such as label and address data on the cards and/or the labels which have been adhered to the signatures as the cards and signatures move past the printing heads. The printing system 39 is operated under control of process computer 25 through an ink jet printing control system 42. The information to be printed is provided by magnetic tape information storage unit 44. The ink jet printing system including the control system 42 is a commercially available item.

Following the processing station 38 along conveyor 10 are signature opening guides 45 and a positioning means 47 for combining the cards printed on-line at printing station 38 with the corresponding signatures. The guide 45 opens the signatures as they pass along conveyor 10 to prepare them for insertion of the proper on-line printed cards and/or additional insert material.

One or more additional card insert heads 50, 51 are provided downstream of the positioning means 47. These insert heads 50, 51 may be employed for the insertion of preprinted cards or other material which may be common to all signatures or which may be personalized to a particular subscriber and correlated with the appropriate signature by process computer 25.

At the end of conveyor 10 the completed and labelled signatures which may be magazines, for example, are supplied to a stacker 55 where they are stacked into bundles and sent on for further handling and shipping. In some cases the signatures may be diverted for special handling by means of divert gas 57, as where the signatures to be mailed to subscribers having the same zip code are so few as to require special handling.

During the on-line feeding, printing and inserting operations described above, process computer 25 employs subscriber information provided from magnetic tape unit 44. The computer also receives information from chain space sensor 59 so as to synchronize instructions to the various stations with movement of the conveyor. The chain sensor 59 may be, for example, a photoelectric sensor which detects one or more index marks on the moving conveyor. Computer 25 provides instructions at the appropriate time to enable the operations described above to be carried out. The process computer may be a commercially available process computer, for example, a PDP 8. The information for each production run may be fed to the process computer by the magnetic tape storage unit 44. The control tape is prepared to contain information provided by subscribers and in machine readable form to enable the appropriate personalized information to be printed on the cards and signature labels and to enable cards and signatures to be collated.

The control system may operate on the magnetic tape information in different ways depending upon the particular computer employed and the particular programming of that computer. In general, however, the control system performs the following functions:

1. Instructs the signature feeder 15 to withhold a signature if that signature is subsequently to receive a card with personalized printing thereon. If the signature is to receive a number of cards the feeder is instructed to withhold the signature for that number of chain spaces.

2. Instructs the label tipper 31 to adhere a blank label onto a signature passing beneath it only if the chain space is to be occupied by a signature.

3. Instructs card feed heads 34 and 35 to feed a card to each chain space from which a signature was withheld.

4. Instructs the ink jet printing system to print personalized information onto the appropriate cards and/or onto the previously adhered labels on the signatures.

5. Instructs the signature-card combining mechanism 47 to collate the cards where two cards have been fed.

6. Instructs the card insert heads 50, 51 to insert preprinted cards where such cards have personalized printing done off-line and are to be combined with specific signatures.

Figure 2:
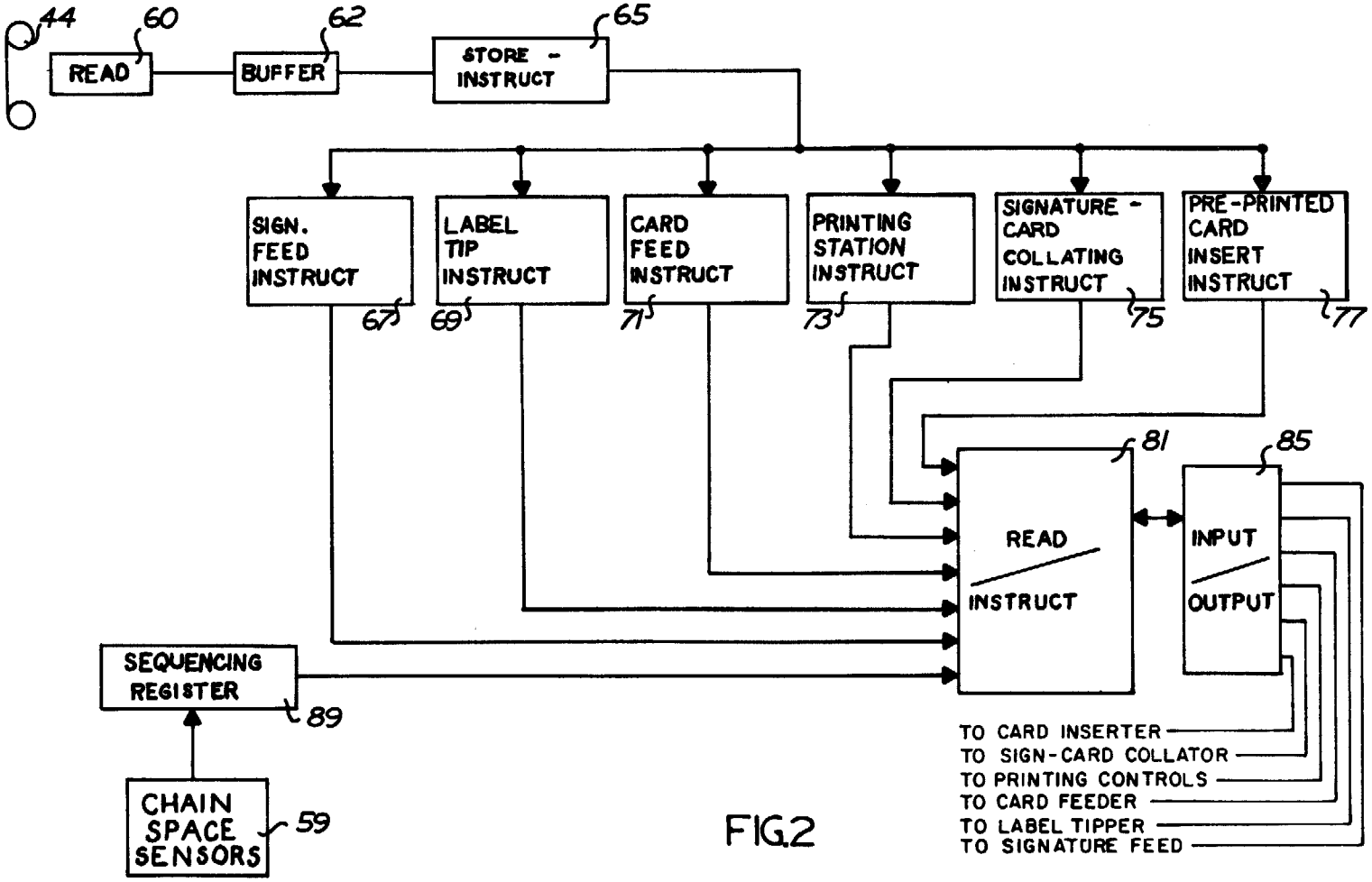
FIG. 2 is a schematic block diagram of the functional operation of the computer employed to control the operation of the system of FIG. 1.

The foregoing functions may be coordinated by the process computer in various ways, but FIG. 2 illustrates schematically the operational functions of a computer to accomplish the desired results. Other internal computer arrangements may, of course, be utilized to achieve the same functional results.

As shown in FIG. 2, information is obtained from the magnetic tape unit 24 by a read unit 60 and is transferred to buffer storage 62 and thereafter to the main memory of the computer. The information is assigned by a store instruct unit 65 to various blocks of addresses in memory for use at the appropriate time. As shown, the instructions as to feeding and withholding of signatures is located in a signature feed store 67 while instructions regarding the remaining principal functions are stored in the other stores identified as 69, 71, 73 75 and 77. The personalized information to be printed is stored in block 73.

Information stored in the various units is transmitted to a read/instruct unit 81 which issues instructions to the appropriate system devices in accordance with the information obtained from the storage units 67 et seq. A request for instructions for the next subscriber to be loaded into storage units may be made by read/instruct unit 81 at the appropriate times via line 87. At any given time in the on-line printing run a number of different subscribers signatures may be in process. It is necessary, therefore, for the computer to issue the appropriate instructions to all of the devices in the system at each conveyor position. Each location along the conveyor at which a device is positioned and which requires instructions from the process computer may be expressed in terms of chain spacings from the entrance to the conveyor. For example, the card feed head 34 may be located ten chain spacings downstream from the entrance to the conveyor.

During each position of the conveyor as determined by the location of the chain spaces with respect to, for example, the entrance to the conveyor the computer must determine and issue the appropriate instructions to control the various devices. This information may be obtained from tape unit 44 and its use synchronized with information from the chain space sensors 59. The chain space position information from the chain sensors 59 may be provided to a sequencing register 89 which communicates with the read/instruct unit 81. The sequencing register causes unit 81 to read the next or appropriate set of instructions for the various devices and to provide instructions through input/output unit 85 to the various devices.

Figure 3:
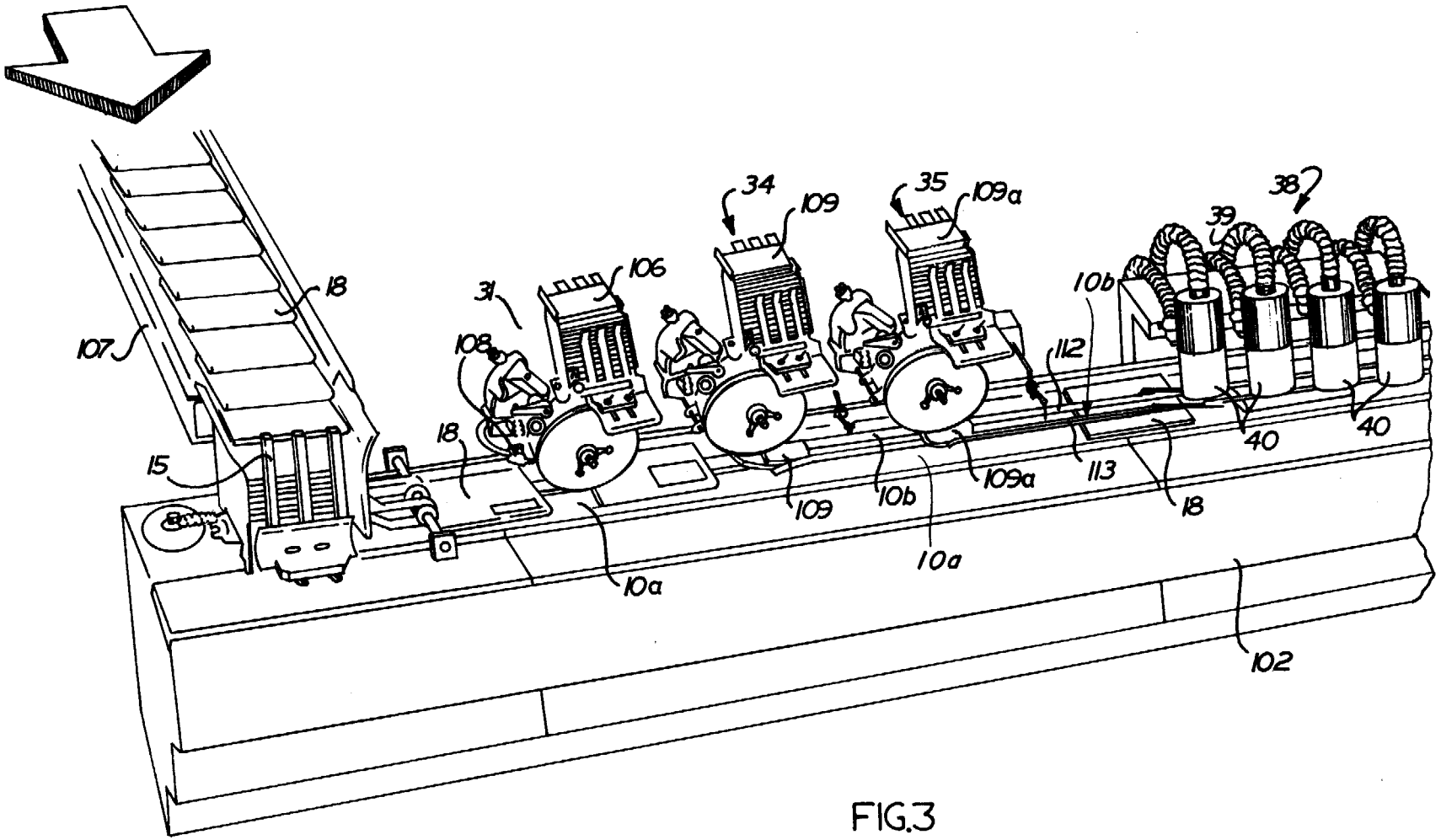
FIGS. 3 and 4 are perspective views of apparatus embodying the present invention, FIG. 3 illustrating the first half of the system shown in FIG. 1 and FIG. 4 illustrating the second half.
Figure 4:
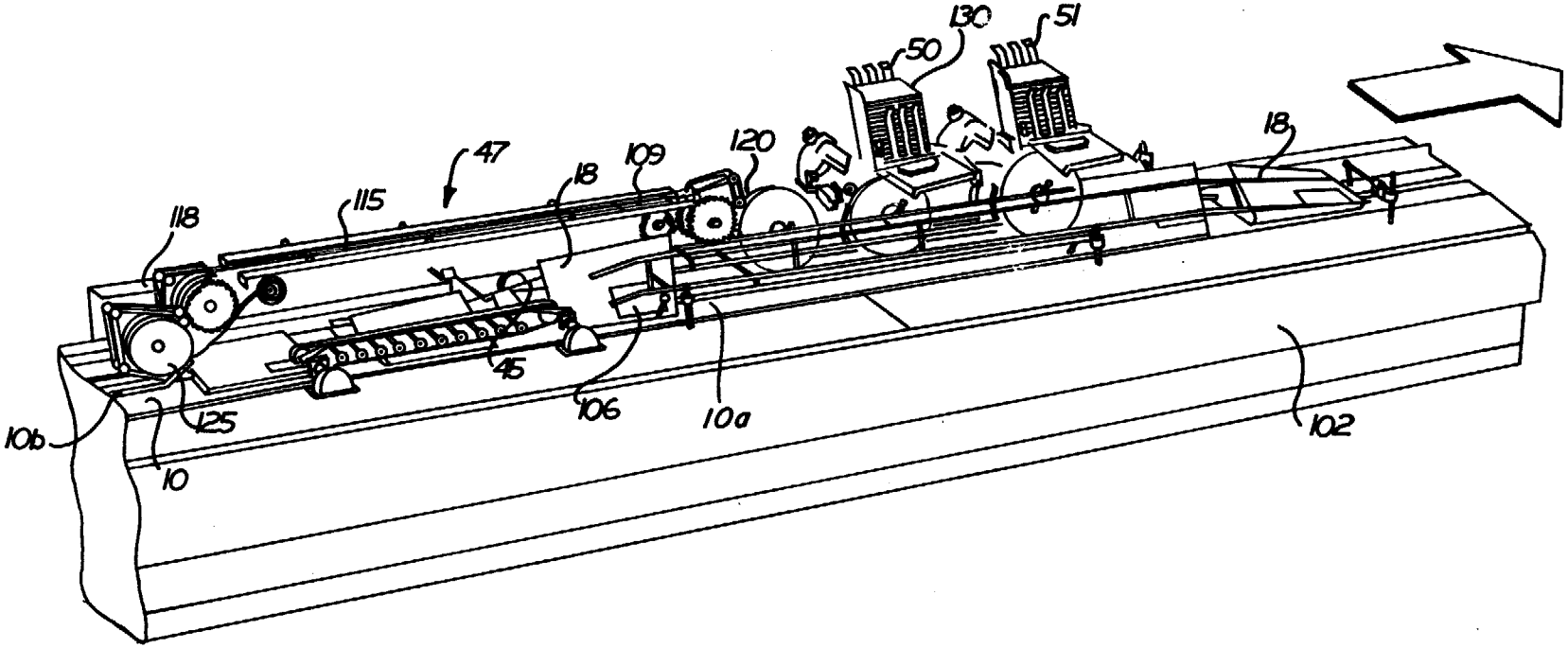

Referring now to FIGS. 3 and 4 along with FIGS. 1 and 2, apparatus embodying the present invention illustrates the conveyor means 10 to include a signature conveyor 10a supported upon a base 102 and a card conveyor 10b located above the signature conveyor. The conveyor 10b is formed by card supporting guides above the conveyor 10a and a pin projecting upwardly from each chain space moves the cards along the guides as the chain space is moved by conveyor 10b. At the entrance end of conveyor 10a a signature feeder 15 is mounted on base 102. Signatures 18 are fed to conveyor 10a and feeder 15 from a trimmer 20 (FIG. 1) along a feed conveyor 107. Signature feeder 15 operates as described above under control of the process computer to feed a signature to or withhold it from conveyor 10a.

The label feeder and tipper 31 is supported above signature conveyor 10a and includes a supply of blank labels 106 and tipping means having an adhesive dispensing nozzle 108. The label feeder and tipper operates in a known manner to adhere a blank label onto a signature passing beneath it along conveyor 10a.

Downstream of label tipper 31 are card feed heads 34 and 35 supported on base 102 above signature conveyor 10a and above the second or card conveyor 10b. Card feed heads 34 and 35 each are provided with a supply of cards or other material to receive personalized printing and to be combined with appropriate signatures. The feed heads 34 and 35 operate in a known manner and under intructions from process computer 25 to feed a card onto conveyor 10b in a chain space directly above and corresponding to a vacant chain space in signature conveyor 10a which was created by withholding a signature from conveyor 10a. Since the chain spaces are vertically aligned they are sometimes referred to in the singular as a chain space. Cards 109 may be fed to chain spaces by either or both of feed heads 34 and 35 and it will be apparent that additional card feed heads may be provided if desired.

The ink jet printing system generally designated 39 is provided at processing station 38 for the on-line printing of personalized information onto either a card 109 on conveyor 10b or onto the label of a signature 18 moving along conveyor 10a. The printing system includes a plurality of printing heads 40, four being shown, for the printing of four lines of information onto a moving card or signature label. The four printing heads 40 are successively offset slightly one from the other to accommodate the spacing between lines of print. It will be noted that card conveyor 10b comprises parallel tracks 112 and 113 with an open space therebetween to allow printing on the signature labels 106 on the lower signature conveyor 10a. Both the printing instructions and the information to be printed are supplied from process computer 25 through the printing control system 42.

After leaving printing station 38 with personalized information printed thereon, the cards and corresponding signatures are ready to be combined. This is accomplished by the positioning means 47. The positioning means includes an auxiliary conveyor 115, a divert gate 118 between card conveyor 10b and auxiliary conveyor 115 and a card insert head 120 between auxiliary conveyor 115 and signature conveyor 10a. Beneath auxiliary conveyor 115 and alongside conveyor 10a is a guide 45 which opens each signature passing along conveyor 10a and retains it open for insertion of cards. It is the function of auxiliary conveyor 115, divert gate 118 and insert head 120 to take on-line printed cards from conveyor 10b, combine the cards where more than one card is to be inserted into a particular signature and deliver the cards to insert head 120 at the proper time for insertion into the appropriate open signatures on conveyor 10a.

The divert gate 118 operates in a known manner to take a card 109 from conveyor 10b and deliver it to auxiliary conveyor 115. If cards are present in adjacent chain spaces, the first card is diverted around drum 125 and combined with the card in the next adjacent chain space. The two cards are then delivered together to auxiliary conveyor 115. The speed of auxiliary conveyor 115 is adjusted to be somewhat less than that of signature conveyor 10a so that a card is delivered to insert head 120 as the open signature 18 which is to receive the card is approaching the insert head. The insert head 120 operates in a known manner to receive cards from auxiliary conveyor 115 and insert them into the passing signatures 18.

After leaving insert head 120 the signatures 18 contain the cards or other inserts having personalized information thereon which was printed on-line. If such cards are the only inserts for a particular signature it will merely proceed down conveyor 10a and will close after leaving the influence of guide 45. Additional off-line preprinted inserts may, however, be inserted into the signature by means of insert heads 50 and 51 before the signature is closed. Each insert head 50, 51 includes a stack of preprinted cards 130 which may be inserted into each passing signature or, under control of the process computer, into only selected signatures.

After leaving the area of insert heads 50 and 51 and guide 45 signatures 18 proceed along conveyor 10a to stacker 55 or to divert gate 57 (FIG. 1) as described above.

In operation, signatures 18 are supplied to signature feeder 15 sequentially. If a particular signature is to receive a number of personalized cards, that signature is withheld from conveyor 10a for a number of spaces corresponding to the number of cards to be received. The signature is then fed to the next chains pace of conveyor 10a. As the signature is moved along conveyor 10a label tipper 31 adheres a label thereto.

Meanwhile, the vacant chain spaces created by withholding of the signature are filled by feeding cards 109, 109a to the corresponding and vertically aligned chain spaces on card conveyor 10b. The card and the corresponding signatures proceed along the conveyors to the printing station 38 where the personalized information is printed onto the cards and/or signature.

After leaving the printing station, the signatures continue along conveyor 10a and pass beneath auxiliary conveyor 115 where they are opened by guide 45. The cards are directed from card conveyor 10b and are stacked if more than one card is to be inserted into the same signature and are delivered to auxiliary conveyor 115. On the auxiliary conveyor the cards are slowed and their position with respect to the corresponding signature adjusted so that they are delivered to insert head 120 at the proper time for insertion into that signature.

The signatures then proceed to the preprinted card insert head 50, 51 where preprinted cards may also be inserted. Following insertion of any preprinted cards, the signatures are stacked for shipping or diverted for special handling as described above.

During the above operation, process computer 25 provides appropriate instructions to each element in the system to cause that element to carry out its function. While those skilled in the data processing arts can readily program known data processing equipment to provide the necessary instructions to the machine from the foregoing disclosure, one exemplary way of providing the intructions in the system as shown in FIGS. 1 and 2 is discussed above. This way involves formatting the subscriber information on the tape to provide the necessary instructions for each of the sections of memory for instructing signature feed, label tip, card feed, etc.

In one exemplary tape format, the subscriber instructions on tape for the memory section 67 for signature feed instruct may use the codes 10, 11 or 00. Either of the code containing a 1 indicates an inhibit while 00 is the feed instruction and an end of instruction indication. The presence of the 10 code on tape results in a feed inhibit for two chain space cycle and the 11 code for one cycle.

Upon reading the code 10, the read/instruct unit 81 would send out an inhibit signal to the signature feeder 15, add 1 to the code 10 and return the sum to the code memory location to be read again in the next cycle. On the next reading, the computer will read 11 and once again will inhibit the feed operation. It will again add 1 to the code in its arithmetic unit and return 00, the last two bits of the sum, to the feed instruct memory section to be read in the next cycle. In the next cycle the computer will read 00 which signals that an inhibit is not to be issued and also that the instruction for the next subscriber is to be inserted into the signature feed instruct memory from the store instruct. The read/instruct unit 81 will direct the store instruct section 65 to load the next subscriber's information in the signature feed instruct memory section.

It will be understood that the data processor may use a scratch pad memory for registering the code to which it adds 1. In this case the processor will always check the scratch pad before reading memory for the subcriber information. A flag bit may be associated with the code in scratch pad memory to enable the processor to determine that a code is present there.

A similar operation may be used for the label tip instruction employing a three bit code 010, 011, or 100. When the read/instruct unit 81 reads 010, it will add 1 to the code and return the sum to the memory section (or to the scratch pad) for reading in the next cycle. When the sum 011 is read on the next cycle the computer will again add 1 to produce the code 100 and return that to the memory section. On the next cycle, which is when the signature will appear at the label tip station since two chain spaces have been reserved for card inserts, the unit will read the code 100 and will issue instructions to tip the signature. The presence of the 1 is required for a tip instruction. The two zeros in the first two bit positions will indicate that the number is not to be returned to memory and the computer will request the store-instruct 65 to load the label tip instruction register 69 with instructions for the next subscriber.

Since the label tipper 31 is downstream of the signature feeder 15, a delay corresponding to the number of chain spaces from the signature feeder to the label tipper must be provided. Further, it is clear that the label tip instruction memory 69 should have enough storage capacity to store subscriber information corresponding to the number of chain spaces from the signature feeder to the label tipper. This is readily accomplished by using memory. For example, if 10 chain spaces is the proper delay then 10 additional storage locations are used to provide the delay. The first subscriber information is loaded into memory in the location following the 10 "delay" storage locations. On the first 10 cycles the first 10 storage locations will be read which will have been initialized to all zeros. As each location is read the double zero will indicate that new subscriber information is to be inserted. Depending upon the type of memory the first subscriber's information can be shifted down one storage location on each cycle and the following subscriber's information loaded. Or, as will be apparent to those skilled in the art, address generation may be used to move pointers to the proper storage locations and to write the new subscriber information sequentially into the next storage location.

The card feed instruct memory 71 is divided into two memory sections, one for the first card insert station 34 and one for the second card insert station 35. The information formatted for each card insert station will be one of the codes 010, 011, or 100. Card insert station 34 will be instructed to insert in response to the code 011 and station 35 on the code 010. However, the mode of operation is essentially the same as described with respect to the other memory sections. If two cards are to be inserted for the particular subscriber, the second insert station 34 will insert on the first cycle and the first insert station 35 will insert on the second cycle. Accordingly the code on tape for both stations is 010. The first card is inserted by station 35 on the first chain space cycle in response to the code 010. The read/instruct unit 81 reads the code 010 for each station, instructs station 35, adds 1 to the code and returns the sum to the memory section. On the next cycle unit 81 will read 011 for each station which will effect the insertion by station 34 of the second card in the following chain space. In each case, after reading the code 011 the computer will again add 1 to it to form the code 100 and return it to the memory section since the computer has not yet seen two zeros in the first two bit positions. On the next cycle the read/instruct unit 81 will read the two zeros and signal the store instruct to insert new information into the memory. This will bring the next subscriber's information into the readout position or modify the address generators to read the subscriber information immediately following the just completed subscriber's information.

When only one card is to be inserted it may be at either card insert station 34 or 35 and in either case it will be in the first cycle. Since station 34 responds to the code 011 and station 35 does not this code for both stations will provide the desired result if the card is to be inserted by station 34. If the card is to be inserted by station 35 the code 011 is used which instructs only station 35 to insert on the first cycle. The 1 in the most significant bit position indicates that 2 rather than 1 should be added to make the sum 000 on the next cycle.

The 00 code again indicates readiness for the next subscriber information.

The code 10 is used to instruct the collator 47 to combine the first and second cards. This instruction only occurs when there are two cards which means the subscriber has three allotted chains. Accordingly when a divert is needed, the tape will always be formatted with 10. When the code 10 effects instruction, it will be incremented by 1 on each cycle and returned to memory until the computer sees the code 00 to accommodate the fact that there are three chain spaces alloted to this subscriber.

The instruction code for the preprinted card insert stations 50 and 51 will each be formatted in a manner similar to the label tip instruct code since one or both cards must be inserted only into the chain space containing the signature. When the code has 00 in the first two bit positions which indicates that new subscriber information is to follow, the particular station must be instructed to insert or not insert. This is done by the presence of a 1 in the third bit position as was done in the case of the label tip instruction.

The information to be printed on the cards and/or signature is formatted in a somewhat different way than described above. Depending on the particular reader and tape format, the information may beneficially be placed as the last information on the tape for that subscriber to allow the position of the other instruction codes on tape to indicate the particular memory section for which they are intended. After all memory sections have been filled for a given subscriber, it would then be apparent that any following information is for the print station.

Each subscriber magazine may have alotted to it from none to two postcard chain spaces as well as a signature space. If one or more cards are present printing may be desired on any one of the cards or any combination of the cards and signature. Accordingly, the system must not only accommodate the very number of card spaces but must also accommodate the fact that the printing may go on any combination of cards. As readily recognized by those skilled in the art, this may be accomplished by formatting the tape so that if there is more than one article, card or signature to be printed upon, the respective printing information is placed into successive storage locations so as to be read in the order in which it will be printed by the print station. For example, if two postcards and the signature are each to receive printed information, the store instruct will read the three lines of information and place them in three different successive storage locations in memory for print instructions in the order they are to be printed. In this case, it would be information for the first postcard inserted by station 35, information for the second postcard inserted by station 34, and then the signature information.

If the subscriber's magazine is utilizing three chain spaces which means three possible printings there will be three codes on the tape. Each code will indicate print or do not print for its respective card or signature. The print code will have the information to be printed associated with it. The read/instruct unit will read the respective codes in the proper order on consecutive machine cycles and issue the print or don't print instructions contained therein. In this mode of operation the next print memory location is always read on the next machine cycle.

While an exemplary manner of programming a computer, it will be understood that a computer is not necessary to practice the invention as will be obvious to those skilled in the art. For example, the entire machine format for each cycle of operation could be formatted on the tape and read by the machine each cycle. Obviously, with the subscriber information available one could assign successive chain spaces to certain subscribers and lay out the precise operation for each station for each cycle of operation of the machine. This information could be coded on tape in the form of operate or do not operate instructions for each station in each cycle. The tape would then merely be synchronized with the machine to be indexed each cycle with the operation of the machine.

Similarly, the subscriber information could be coded in what might be termed source language and translated into language used by the machine in a manner fully described in U.S. Pat. No. 3,668,653. Moreover, by using various decoding arrays, the mere indication on tape of whether or not a card is to be inserted at each of the stations 34 35 could be used to derive appropriate instructions for most of the other stations. Information for printing and for insertion of preprinted cards would also have to be on tape.

It will be obvious to those skilled in the art that a simple shift register memory system may be utilized. In such a system, an eight channel tape 44' may be used. For each subscriber three channels of the tape, A, B, C, are utilized for three bit station codes which control the operation of the respective station and eight channels are used for information to be printed or control codes.

For the station codes a 1 is placed in one of the channels A, B, C to effect operation of the stations. The channel in which the 1 occurs in the signature feed code will indicate the spaces allocated to the subscriber, a signature only or spaces for the signature and 1 or 2 card inserts by stations 34, 35. A 0 bit in channels A, B, or C in the station code indicates that there is no operation to be performed by the station on a space allotted to the subscriber or no space has been allocated insofar as channels B and C are concerned.

If there is only one chain space allocated to the subscriber, for example if a subscriber is to receive only the signature with no postcards inserted by the card inserting stations 1 and 2, all the 1's for the stations for that subscriber will be in channel A and all the other channels will have 0's.

If the subscriber is to be allocated two chain spaces, then the signature feed 1 will be in channel B with an 0 in channel A and the other stations may have a 1 or 0 in either channel A, channel B, or both depending upon whether the station is to perform an operation on the chain space ahead of the signature space, the signature space, or both. If the stations are not to perform any operation then all zeros will appear. All stations will have zeros in channel C since only two chain spaces are allotted.

When three chain spaces are allotted, it will be clear from the foregoing that the signature feed insert 1 will appear in channel C and 1'will appear in eithers channels A, B or C for the other stations depending on the chain space at which an operation is to be performed by the station with all stations having a 1 in only one of the three channels except for the print station which is capable of printing on an item in any of the chain spaces and may have as high as three 1's, that is, a 1 in each of the channels A, B and C. The tape in FIG. 5 has been coded in accordance with the above for feeding cards at stations 1 and 2 and for printing to occur on only the second line of the card inserted by the firt station.

The print information is the last information on the tape for a subscriber to enable the positioning of the codes on the tape to indicate the particular station for which the information is intended without applying station codes. When the tape reader reads the last code for station operation, it knows that the following information is the information to be printed. Each subscriber block may have a subscriber end code on the tape to inform the tape reader as to the end of print information.

Since there are four heads at the print station to print four lines, the parallel coded print information on the tape which is in a conventional 8 bit code for each character, will have an end of line code for each line which will indicate that the following information is for the second line, the third line, and the fourth line, in sequence. The information when read is stored and is loaded in parallel into print memories 73a, 73b, 73c, 73d, one for each line of printing so that if only one line, for example, is to be printed, it will be printed in the first print head and the other three print registers will be empty of print data. If there is no printing on the other lines, the tape will have a no print code formatted for the line which will be detected at the print station when reading the print-memory for the line.

Figure 5:
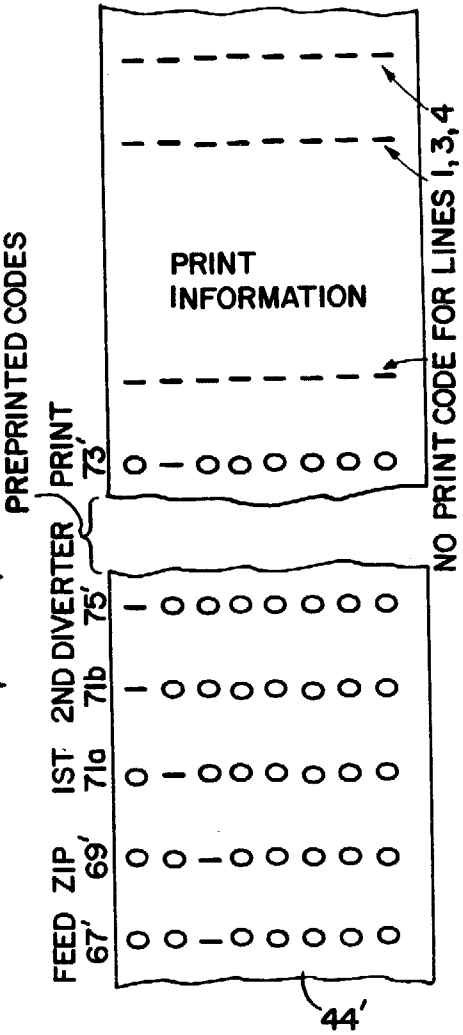
FIGS. 5 and 5a are an illustration of a shift register control system which may be utilized in the present invention.
Figure 5A:
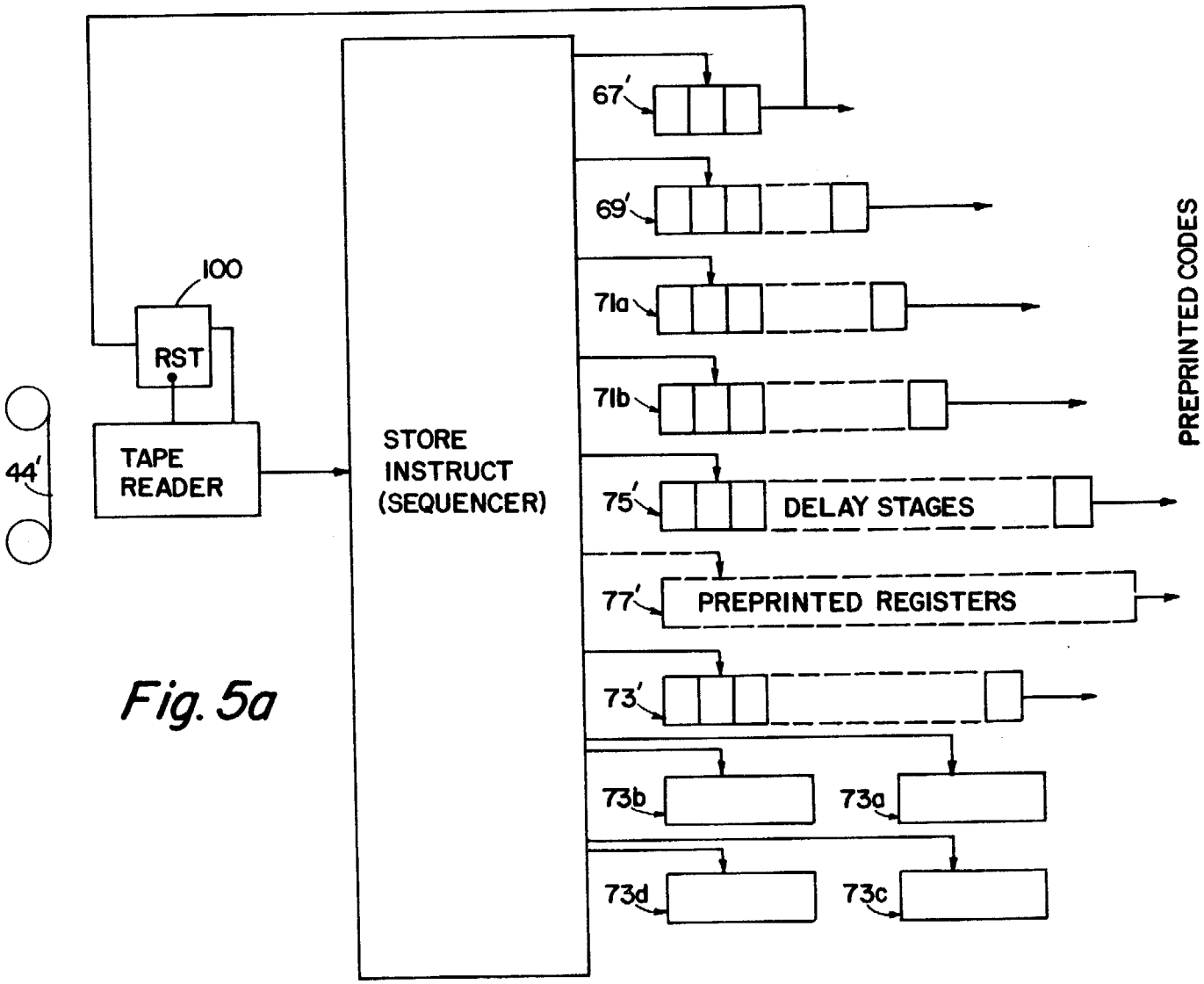

Referring to FIG. 5, the 8 channel tape 44' is illustrated to accommodate the 8 bit print codes as well as the three bit operate codes. The tape reader 60' sends the subscriber information codes in parallel to a store instruct circuit 65' which will direct the codes in sequence to the signature feed shift register 67', the label tip register 69', the first card insert register 71a, the second card insert register 71b, the divert register 75', the preprinted card registers (omitted from FIG. 5 for simplicity) and subsequently to the print shift register 73'. Following the loading of the print codes, the print information which will then be directed to the line print memories 73a, 73b, 73c, 73d to load the print information in sequence into the memories. The last code for a line of printed information will be an end of line code so that when read, the following print information for the next line will be loaded into the next print line memory. The tape will have a no print code on it for each line not to be printed and these will be loaded into the corresponding print memory to indicate no printing on that line and will be recognized as an end of line code.

To instruct the signature feed station only requires a three bit shift register in the illustrated embodiment, i.e., one bit for each possible space allocated to the subscriber. The data from channels C, B, A is loaded into the first, second and third stages respectively of the shift register 67'. If the subscriber is to have a signature fed and no cards at card station 1 or 2, a signature feed instruct, a 1 from channel A, will be loaded in the third or last stage of the shift register and zero will be in the other stages. The shift register is clocked once in each machine cycle and when a 1 is shifted from the third stage of the register, the register will set an index flip/-flop 100 to indicate that the signature has been fed to cause the tap index to read the next subscriber information. Since the signature feeders operate unless inhibited, the digit one here signifies that the feeder is not to be inhibited.

If the subscriber has two or three chain spaces alloted, the 1 for the signature feeder will be loaded from channel B or C respectively in the second or first stage of shift register so that the feeder is inhibited for the first or the first and second chain spaces and operates on the second or third chain space for the subscriber.

In the case of the label tip station, as well as the other station register, the instruct information is read into the first three stages of the register in the same manner as the signature feed. That is, if the station is to operate on the first chain space for the subscriber, the 1 will appear in the third stage of the shift register so that it is shifted through the register in advance of any information in channels B or C. However, the shift register is provided with a delay section after the third stage with a number of stages corresponding to the machine cycles required for the 1 from the third stage to be shifted synchronously with the movement of the chain space to the label tip station. As explained above, in the case of both the label tip and the signature feed instruction, if two pockets are assigned, the 1 will be loaded from channel B into the second stage of the shift register while if three spaces are assigned the 1 will be loaded from channel C into the first stage of the register.

Similarly, the other station shift registers 71', 73', 75' and 77' have the first three digit spaces for loading the instructions into the shift register and the appropriate delay. In each case, except for the printing station, a 1 will appear in only one of the first three stages depending upon whether the operation is to be performed upon the first, second or third subscriber spaces advancing through the station.

As also explained, the print operate register may have no ones in the first three stages or one, two or three ones depending on whether or not the printing is to occur on one, two or three items assigned to the subscriber.

In the case of a subscriber with two chain spaces allotted, the second card insert station 35 may be required to insert the postcard immediately ahead of the signature space rather than the firt card insert station 34. The format above readily accommodates the situation. Only channels A and B will be information channels in this situation with the tape formatted with a 1 in channel B for the signature insert feeder and the label tipper and in channel A for a second card insert station 35 with zeros appearing for all of the other stations except as a print operation is to be performed or a preprinted card is to be inserted into the signature. It will be noted that for the preprinted card insert stations 50, 51, the 1 for directing operation of the preprinted card insert for a subscriber will always be in the same channel on the tape as the 1 for the signature feed insert. Similarly, it will be noted that the 1 for controlling the divert gate will always appear in channel A and will only be present when two cards are being inserted by the first two card insert stations. This is true because the divert gate is only used to collate the second card inserted to the first card inserted so as to move the two together for insertion into the signature. The card insert station 120 needs no instruction since it can merely operate on a cycle basis.

During operation, the shifting of a 1 from signature feed instruct register will dictate the feed of a signature. This also indicates that the store instruct is to load new subscriber information into the instruct memories for the next subscriber. The flip flop 100, as noted above, is set each time a one is read from the feed instruct register 67' to initiate the loading of the next subscriber information. The signal from the flip flop initiates the reading of the tape each time it is set and the store instruct circuit 65' distributes the data in the manner above described. The tape reader resets the flip flop 100 when it completes the reading of the information.

While a preferred embodiment of the present invention has been disclosed and described in detail herein, it will be apparent to those skilled in the art that changes and modifications may be made to the embodiment specifically disclosed without departing from the spirit and scope of the invention. Accordingly, this invention is not to be limited to the specific form and embodiment disclosed herein nor in any other manner inconsistent with the progress in the art promoted by the invention.

What is claimed is:

1. Apparatus for collating preprinted signatures and at least one card comprising a station for processing preprinted signatures and cards, conveyor means for moving preprinted signatures and cards past said processing station, said conveyor means having a series of chain spaces each of which is adapted to receive either a printed signature or a card, signature feeding means for feeding preprinted signatures into said chain spaces, card feeding means for feeding cards into said chain spaces, control means for controlling said signature feeding means and said card feeding means to withold a signature from and feed a card to one chain space and feed a signature to another chain space, and means located downstream of said processing station for positioning a card that moved through said processing station from said one chain space into said another chain space having a signature located therein.

2. Apparatus as claimed in claim 1 wherein said conveyor means comprises a signature conveyor and a card conveyor having corresponding chain spaces, said control means controlling said signature feeding means and said card feeding means to feed either a signature to a chain space of said signature conveyor or a card to a corresponding chain space of said card conveyor.

3. Apparatus as claimed in claim 2 wherein said card conveyor guides said cards through said processing station to said positioning means, and said conveyor and said signature conveyor being so arranged as to permit processing at said processing station of a card on said card conveyor or of a signature on said signature conveyor.

4. Apparatus as claimed in claim 3 wherein said card conveyor is positioned above said signature conveyor and includes a central opening to permit processing of signatures therebelow.

5. Apparatus as claimed in claim 1 further comprising means at said processing station for printing personalized information onto said cards [and] *or said* signatures under control of said control means as said cards and signatures pass said processing station.

6. Apparatus as claimed in claim 5 wherein said printing means comprises an ink jet printing system.

7. Apparatus as claimed in claim 1 wherein said control means instructs said signature feeding means to withhold a signature from said one chain space only if said signature is to receive a processed card at said positioning means.

8. Apparatus as claimed in claim 1 wherein said control means instructs said card feeding means to feed a card to a chain space only if a signature has been withheld from said chain space.

9. Apparatus as claimed in claim 1 including means for detecting the position of a chain space on said conveyor means and for providing information to said control means regarding said position, and wherein said control means utilizes said information to track individual signatures and corresponding cards.

10. Apparatus as claimed in claim 1 wherein said positioning means comprises means for positioning a card for insertion into a signature in said another chain space intended to receive said card, means for diverting card from said conveyor means to said insertion positioning means, and means for inserting said card into said signature as said signature moves along said conveyor means.

11. Apparatus as claimed in claim 10 wherein said means for positioning a card for insertion includes an auxiliary conveyor onto which said card is diverted, said auxiliary conveyor moving said card at a rate with respect to said conveyor mean such that said card is positioned at the end of said auxiliary conveyor for insertion into said signature in said another chain space intended to receive said card.

[12. A method for collating preprinted signatures and at least one card comprising the steps of providing a path having a series of spaces each adapted to receive a signature or a card, moving said spaces in said path, withholding a signature from and feeding a card to one of said spaces and feeding a signature to another of said spaces, processing said signatures and cards while they are moving in said path, and positioning a card from said one of said spaces into said another of said spaces containing a signature.]

[13. A method as claimed in claim 12 wherein the step of providing a path includes the steps of providing separate path segments for signatures and for cards, said path segments having corresponding spaces for receiving either a signature on said signature path segment or a card on said card path segment.]

[14. A method as claimed in claim 12 wherein a signature is withheld from and a card is fed to a particular space only if that card is to be positioned after processing in a space occupied by said signature.]

15. A method as claimed in claim [12] *22* wherein the steps of processing *said* signatures [and] *or* cards comprises printing personalized information onto said signatures [and] *or said* cards moving in said path.

16. A method as claimed in claim [12] *22* wherein the step of positioning a card from said one space into said another space containing a signature comprises the steps of diverting said card from said path, positioning said card for insertion into said space containing a signature and inserting said card into said space containing a signature.

17. A method as claimed in claim [12] *22* further comprising the steps of determining the location along said path of signatures and cards and controlling said processing and said positioning in response to the location of certain cards and certain signatures at certain locations along said path.

18. A system for on-line processing and combining of preprinted signatures and inserts therefor comprising:

conveyor means for carrying said signatures and inserts, said conveyor means having a series of chain spaces for receiving either a signature or an insert, means for feeding preprinted signatures onto said chain spaces, means for feeding inserts onto said chain spaces, means along said conveyor means for processing signatures [and cards] *or inserts* moving along said conveyor means, storage means for storing and providing information to said processing means as to the processing of said signatures [and] *or* inserts, means located downstream of said processing means for positioning an insert from one of said chain spaces into another of said chain spaces having a signature located therein, and control means connecting said storage means with said conveyor means, said signature feeding means, said insert feeding means and said processing means for instructing the [witholding] *withholding* of a signature and the feeding of an insert to said one chain space, the feeding of a signature to said another chain space and the processing of said signatures and inserts in accordance with information in said storage means.

19. A system as claimed [from] *in* claim 18 wherein said processing means includes printing means for personalized on-line printing of information provided by said storage means onto said inserts [and] *or* signatures moving on said conveyor means.

20. A system as claimed in claim 18 wherein said control means instructs the feeding of inserts to chain space which are adjacent signatures intended to receive said inserts in accordance with information provided by said storage means.

21. A system as claimed in claim 20 wherein said positioning means includes means for positioning an insert for insertion into an adjacent chain space having a signature located therein, means for diverting inserts from said conveyor means to said insertion positioning means, and means for inserting said diverted insert into said adjacent chain space having a signature located therein.

*22. A method for collating preprinted signatures and at least one card comprising the steps of*

*providing a single linear series of consecutive spaces each adapted to receive a signature or a card,*

*moving said consecutive spaces in a single path,*

*withholding a signature from and feeding a card to one of said consecutive spaces and feeding a signature to another different consecutive space,*

*processing said signatures or said cards while they are moving in said single path, and*

*positioning a card from said one of said consecutive spaces into said another different consecutive space containing a signature.*

* * * * *